US005569421A

United States Patent [19]

Grone

[11] Patent Number: 5,569,421
[45] Date of Patent: Oct. 29, 1996

[54] PROCESS FOR THE PRODUCTION OF A FOLDABLE BLANK OF PLASTIC FOAM BY COLD FORMING

[75] Inventor: Horst-Ditmar Gröne, Schwanewede, Germany

[73] Assignee: Lin Tec Verpackungstechnik GmbH, Ritterhude, Germany

[21] Appl. No.: 154,129

[22] Filed: Nov. 18, 1993

Related U.S. Application Data

[63] Continuation of Ser. No. 620,941, Dec. 3, 1990, abandoned, which is a continuation-in-part of Ser. No. 199,651, May 27, 1988, abandoned.

[30] Foreign Application Priority Data

May 30, 1987 [DE] Germany .......................... 37 18 300.1

[51] Int. Cl.⁶ .......................... B29C 44/20; B29C 59/02
[52] U.S. Cl. .......................... 264/51; 264/146; 264/148; 264/150; 264/284; 264/285; 264/293; 264/295; 264/297.5; 264/321
[58] Field of Search .......................... 264/51, 53, 284, 264/285, 293, 295, 145, 148, 150, 321, 146, 297.5

[56] References Cited

U.S. PATENT DOCUMENTS

| Re. 31,856 | 3/1985 | Pannenbecker et al. | 264/45.9 |
| 3,387,328 | 6/1968 | Winstead | 264/51 |
| 3,447,199 | 6/1969 | Trimble | 264/321 |
| 3,563,839 | 2/1971 | Divis | 264/321 |
| 3,704,083 | 11/1972 | Phipps | 425/71 |
| 3,716,320 | 2/1973 | Lyon | 425/326.1 |
| 3,789,095 | 1/1974 | Winstead | 264/321 |
| 3,804,684 | 4/1974 | Tokushige et al. | 264/321 |
| 3,879,507 | 4/1975 | Cavanna et al. | 264/51 |
| 3,879,508 | 4/1975 | Gilbert | 264/53 |
| 3,950,208 | 4/1976 | Pavuk et al. | 264/156 |
| 3,985,847 | 10/1976 | Hyun | 264/295 |
| 4,053,549 | 10/1977 | Vandor | 264/321 |
| 4,141,773 | 2/1979 | Keuchel | 264/51 |
| 4,189,456 | 2/1980 | Rausing | 264/51 |

FOREIGN PATENT DOCUMENTS

| 1504891 | 2/1970 | Germany . |
| 1704675 | 5/1971 | Germany . |
| 2226596 | 12/1972 | Germany . |

Primary Examiner—Allan R. Kuhns
Attorney, Agent, or Firm—Sughrue, Mion, Zinn, Macpeak & Seas

[57] ABSTRACT

Blanks serving for the production of insulating material and folding packs have to be provided with folding and bending lines. These folding and bending lines in the plastic foam must not break when the blank is folded. This is achieved according to the invention by embossing the folding and bending lines for forming the blank into the "fresh" web of material which for the most part still contains expanding agent. The folding and bending lines formed in this way have surprisingly proved to form durable hinge lines in the plastic foam material and make it possible to fold up the blank for forming a folding carton without it breaking or cracking.

13 Claims, 5 Drawing Sheets

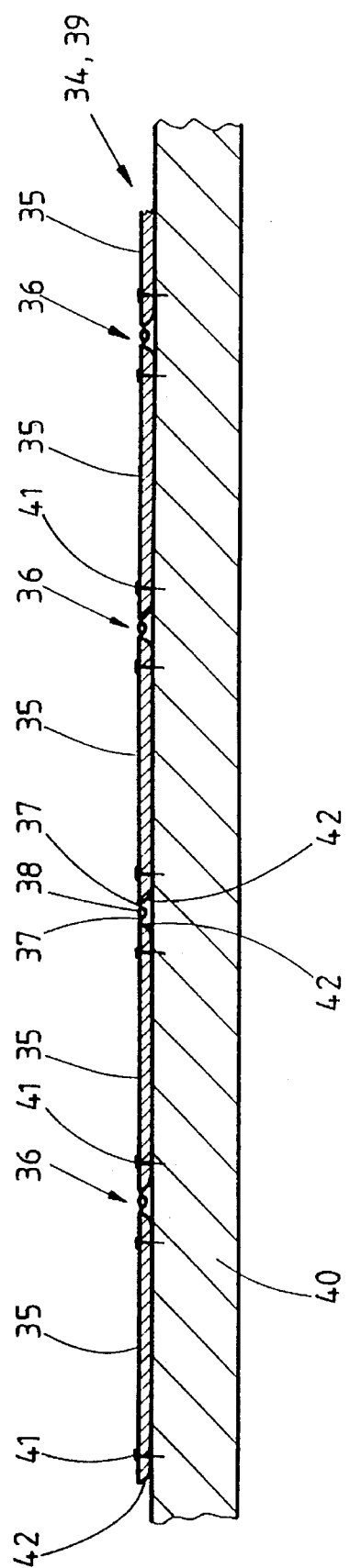

PROCESS FOR THE PRODUCTION OF A FOLDABLE BLANK OF PLASTIC FOAM BY COLD FORMING

This is a Continuation of application Ser. No. 07/620,941, filed Dec. 3, 1990, now abandoned, which is a CIP of application Ser. No. 07/199,651, filed May 27, 1988, now abandoned.

BACKGROUND OF THE INVENTION

The invention relates to a process for producing a foldable blank made of plastic foam for forming packs, insulations etc. The invention further relates to an insulating material formed from such a blank.

The production of such foldable blanks from plastic foam presents problems in many respects. On the one hand, there is the danger that, when the blank is folded, cracks will occur at the folding edges. On the other hand, folding or bending lines are very complicated to form in plastic foam.

To prevent an undesirable breaking of the folding or bending lines of the blank, it is already known to provide a web of material made of plastic foam or a blank already severed from this with appropriate embossings. These embossings have hitherto been made by reheating the web of material cooled after foaming, until it can experience permanent deformation, that is to say the necessary folding and bending lines can be pressed permanently into the plastic foam material. Apart from the fact that the subsequent reheating of the web of material involves an additional outlay incurring considerable energy costs, a secondary expansion of the reheated plastic foam occurs and leads to undesirable losses of strength.

SUMMARY OF THE INVENTION

Starting from the foregoing, the invention is based on the object to provide a process for producing blanks of plastic foam, for forming for instance packs or insulations, which can be easily and cost-effectively conducted, specifically without the properties of the plastic foam being appreciably impaired.

To achieve this object, the process comprises the steps of forming a web of material by extruding a web of material from plastic foam containing an expanding agent; and, immediately after cooling of said web of material, while at least the greater part of said expanding agent is still contained therein, embossing folding or bending lines in said web of material. It surprisingly proved that embossings can still be made in the "fresh", but already cooled web of material, provided that it still contains the expanding agent, preferably pentane, necessary for producing the web of material. Folding cartons or foldable insulating sheets can be produced without difficulty from the blanks embossed with folding and bending lines in this way, since these lines have a surprisingly good hinge effect, that is to say the individual portions of the blanks are pivotable relative to one another without breaking or tearing, even though the blanks consist of plastic foam, preferably expanded polystyrene, being porous per se. If the folding and bending lines were embossed later, as it is prior art practice, the bending lines of the blank would break if the plastic foam was not previously heated up. This step is necessary because the expanding agent evaporates a certain time after the foaming of the plastic. However, as has been shown, this is necessary for a preferably cold embossing of the blanks.

Appropriately, the embossing of the folding and bending lines is carried out immediately after the cooling of the extruded plastic foam film tube and of the web of material formed therefrom, particularly when approximately the total proportion of expanding agent necessary for the foaming of the extruded plastic tube is still contained in the latter. Since the expanding agent begins to evaporate only a certain time after the cooling of the web of material, the best possible embossing can still be carried out after cooling. It has also been shown that an embossing with satisfactory results is still possible when some of the expanding agent has already escaped from the web of material. The proportion of expanding agent should still amount to at least 60% during embossing.

The process as taught by the invention can be conducted particularly economically, if the blank is severed from the material, preferably by an encircling embossing cut, at the same time as the folding or bending lines are embossed. It is also possible for several blanks located next to one another to be severed from the web of material and embossed simultaneously. This results in a further increase in efficiency of the process according to the invention.

An insulating material for attaining the object of the invention is characterized by comprising several insulating plates and hinges for connecting said insulating plates, each of said hinges being formed by two embossing lines extending parallel to one another at a distance and by a connecting web located thereinbetween. Because of the special design of the hinges, the insulating plates can be easily folded together concertina-like, so that all insulating plates lie on top of one another in a stack. Assigning two parallel embossing lines to each hinge has two effects: On the one hand there is only a swing of 90 degrees at each embossing line when the insulating plates are (rectilinearly) pulled straight from their concertina-like folded transport position, i.e. when there is a pivoting of 180 degrees. On the other hand, the connecting web between the embossing lines bridges the difference of thickness between two adjacent edges of linked insulating plates when these are folded on top of one another. As a result, the insulating plates can be folded together without any obstructions and with relatively small restoring forces, so that they come to lie on top of one another.

Further subclaims relate to the design of the edges of the insulating plates adjoining the embossing lines, the design of the connecting web and the distance between the embossing lines. These measures help to achieve that thicker insulating plates can also be folded together concertina-like without any obstructions.

BRIEF DESCRIPTION OF THE DRAWINGS

An exemplary embodiment of the process according to the invention, a blank for forming a folding carton and an insulating material are described below in more detail with reference to the drawings, in which:

FIG. 5 shows the folded-out insulating material according to FIG. 4 on a reduced scale.

DETAILED DESCRIPTION OF PREFERRED EMBODIMENTS

The process described in the following serves for producing blanks from an extruded web of material made of a plastic foam, in particular extruded polystyrene. The blanks are particularly suitable for forming folding cartons or insulating materials.

Figure 1:
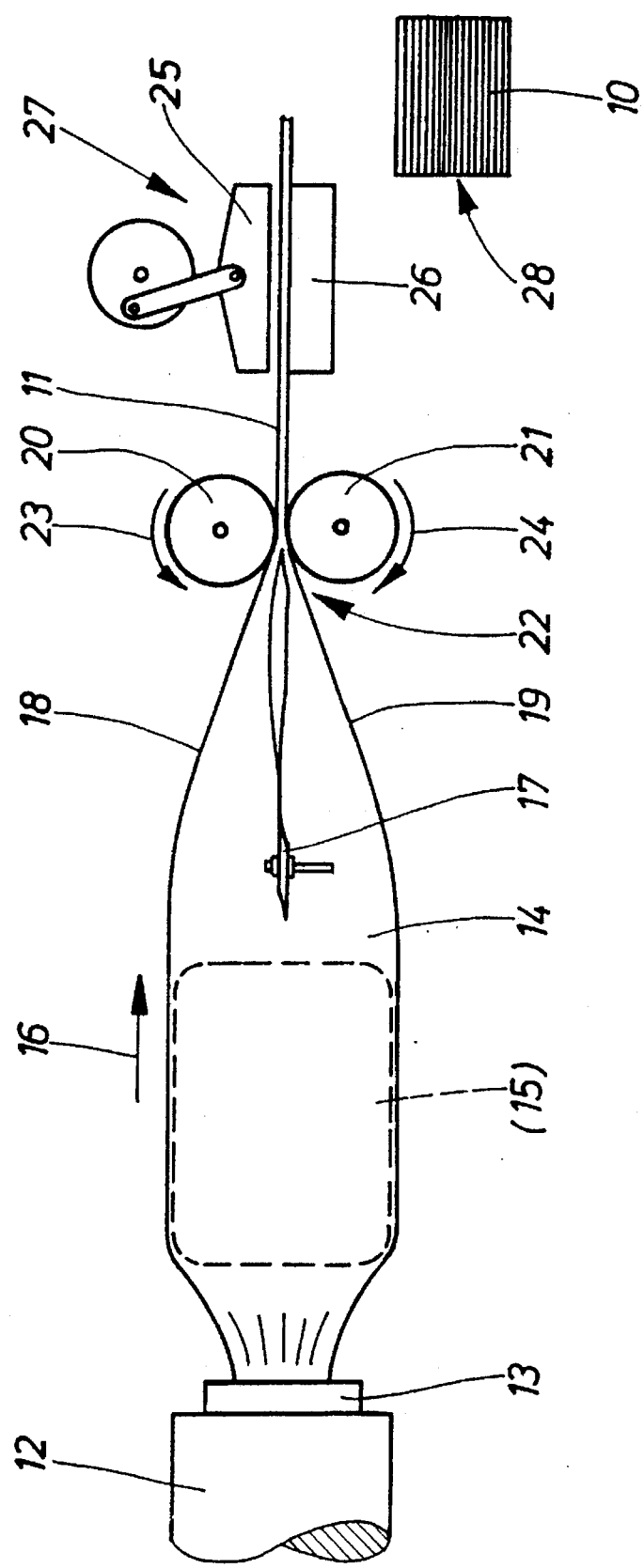
FIG. 1 is a schematic side view of the apparatus for conducting the process according to the invention.
Figure 2:
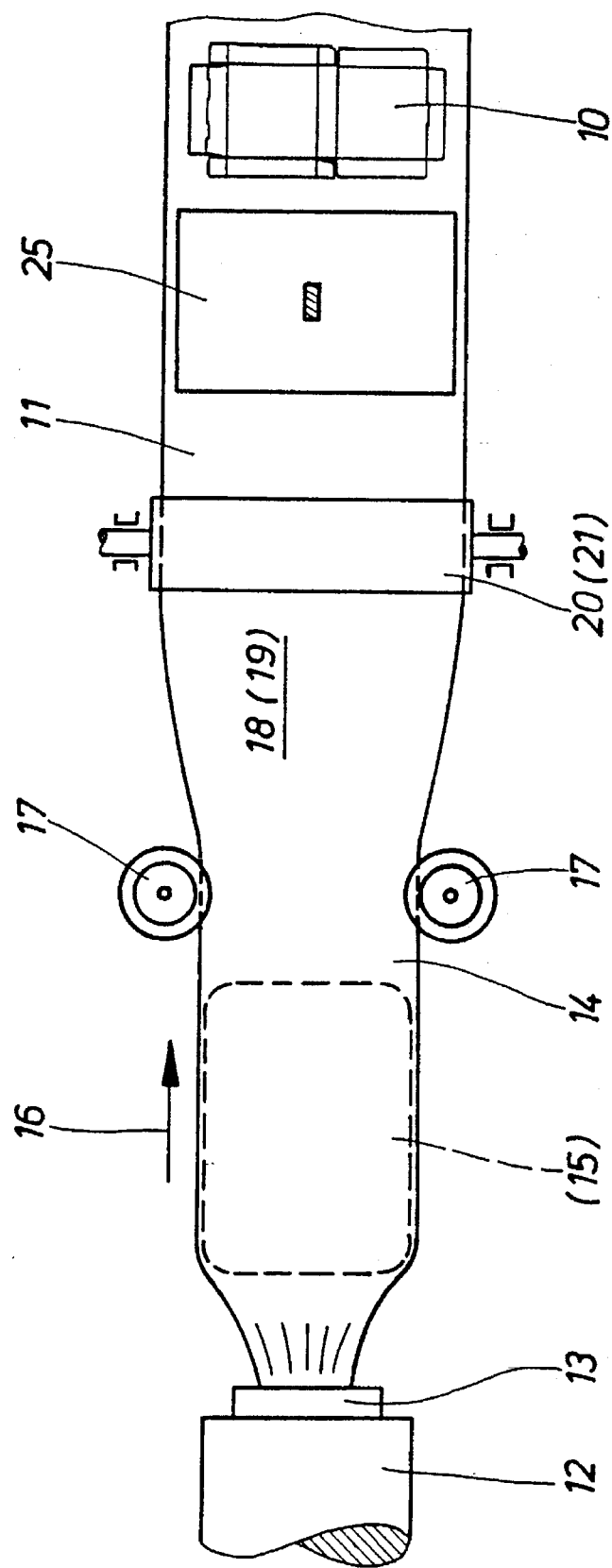
FIG. 2 is a top plan view of the apparatus according to FIG. 1.

The blanks can be produced on the apparatus shown in FIGS. 1 and 2. This apparatus comprises an extruder 12, of which only the region of an extruder die 13 is shown here. The extruder 12 produces a tube of material 14 which, after the outflow of the plastic foam (polystyrene) foamed by means of a suitable expanding agent, for example pantane, expands, that is to say increases its dimensions. After the plastic foam leaving the extruder 12 has expanded virtually completely, a tube of material 14 widening at the same time, the latter is drawn over a cooling mandrel 15 which is located inside the tube of material 14 and which is designed preferably cylindrical.

The tube of material 14 leaves the cooling mandrel 15 after it has cooled to such an extent that it can be processed further. For this purpose, the cooling mandrel 15 is followed, namely in the direction of extrusion as indicated by arrow 16, immediately by a severing device which comprises two cutting members located opposite one another, in particular cutting rollers 17 in the present embodiment. The cutting rollers 17 divide the tube of material 15 approximately centrally into two web halves 18 and 19. Accordingly, in the present embodiment, the two web halves 18 and 19 are of equal size and are provided with a mutually opposed, approximately semicircular curvature.

Downstream of the cutting device (cutting rollers 17), the apparatus comprises a pair of rollers having two cylinders 20 and 21 which are arranged above one another with parallel horizontal axes of rotation and the mutually opposite casings of which extend at a slight distance from one another to form a nip 22. The cylinders 20 and 21 are driven in mutually opposite directions as indicated by the arrows 23 and 24, such that in the nip 22 they drive the two web halves 18 and 19 in the direction of extrusion.

The two cylinders 20 and 21 serve for bringing the web halves 18 and 19 together and for eliminating the oppositely semicircular curvature of the web halves 18 and 19. The web halves 18 and 19 brought together between the cylinders 20 and 21 are thereby brought into a horizontal plane which is necessary for the subsequent embossing.

Furthermore, in the present embodiment, between the cylinders 20 and 21 the web halves 18 and 19 are connected permanently to one another to form the web of material 11. This can be done in a way known per se, for instance by means of welding, sealing, adhesive bonding or the like.

The web of material 11 leaving the nip 22 is plane in the desired way, because the two web halves 18 and 19 lie oppositely prestressed in the plane of the web of material 11, a return deformation of the web halves 18 and 19 being prevented as a result of the permanent connection between these.

Immediately after the web of material 11 has been produced, i.e. when the latter is still in the "fresh" state, that is to say with expanding agent which has not yet or only negligibly evaporated, folding and bending lines are embossed into the web of material 11. The folding and bending lines extending correspondence to the folding and bending lines of the blanks for forming a folding carton or an insulating material. The lines are embossed by means of a press. In the shown embodiment, the web of material 11 is led through two press halves 25 and 26 of a press which in this embodiment is designed as an eccentric press 27. The press halves 25 and 26 are provided with appropriate projections which form the folding and bending lines in the blanks. Expediently, the blanks are severed from the web of material 11 at the same time as the lines are embossed. For this purpose, at least one of the press halves 25 or 26 is provided with blade-like projections not shown in the drawings. If necessary, the other press half 25 or 26 can be provided with counter knife edges.

The blank for forming the insulating material does not have to be punched out of the web of material 11, as it can expediently be formed from a web of material 11 having a width corresponding to that of the blank. It is possible though to trim the web of material 11 on both sides for forming the blank. This trimming is preferably conducted continuously by means of further cutting rollers not shown in the drawings which are travelling in the direction of extrusion 16.

The finished blanks 10 for folding cartons severed from the web of material 11 can be collected in a blank stack 28 shown in FIG. 1 after having left the eccentric press 27 before being processed further, i.e. before being folded to cartons.

Figure 3:
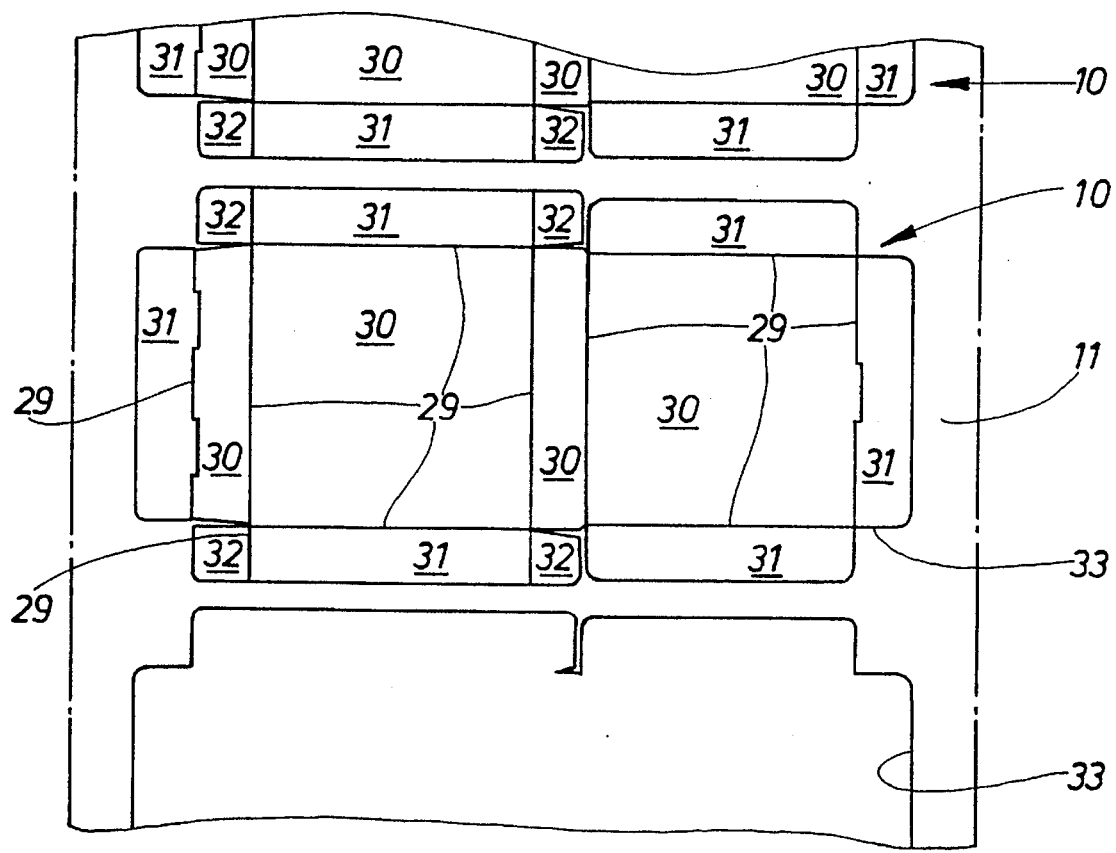
FIG. 3 shows a blank in a web of material which has been produced by means of the process as taught by the invention with the shown apparatus.

FIG. 3 shows the blank 10, as it is intermittently severed from the web of material indicated by dot-dash lines, for example by the eccentric press 27. For this purpose, the press halves 25 and 26 are provided with corresponding cutting and embossing edges, which produce a blank 10 with each press stroke. Alternatively it is possible to severe several blanks 10 lying either behind one another or next to one another from the web of material 11 by means of one press stroke.

The blank shown in FIG. 3 has walls 30, side tabs 31 and corner tabs 32 which are necessary in order to produce a folding carton. The walls 30, side tabs 31 and corner tabs 32 are connected to one another by means of the respective folding lines 29 which are embossed in the web of material 11 by means of the eccentric press 27 immediately after the web of material 11 has been produced, i.e. when the latter is still in the "fresh" state. An encircling trimming of the blank 10 takes place at the same time, i.e. the latter is severed from the web of material 11 by means of an encircling cutting line 33.

Figure 4:
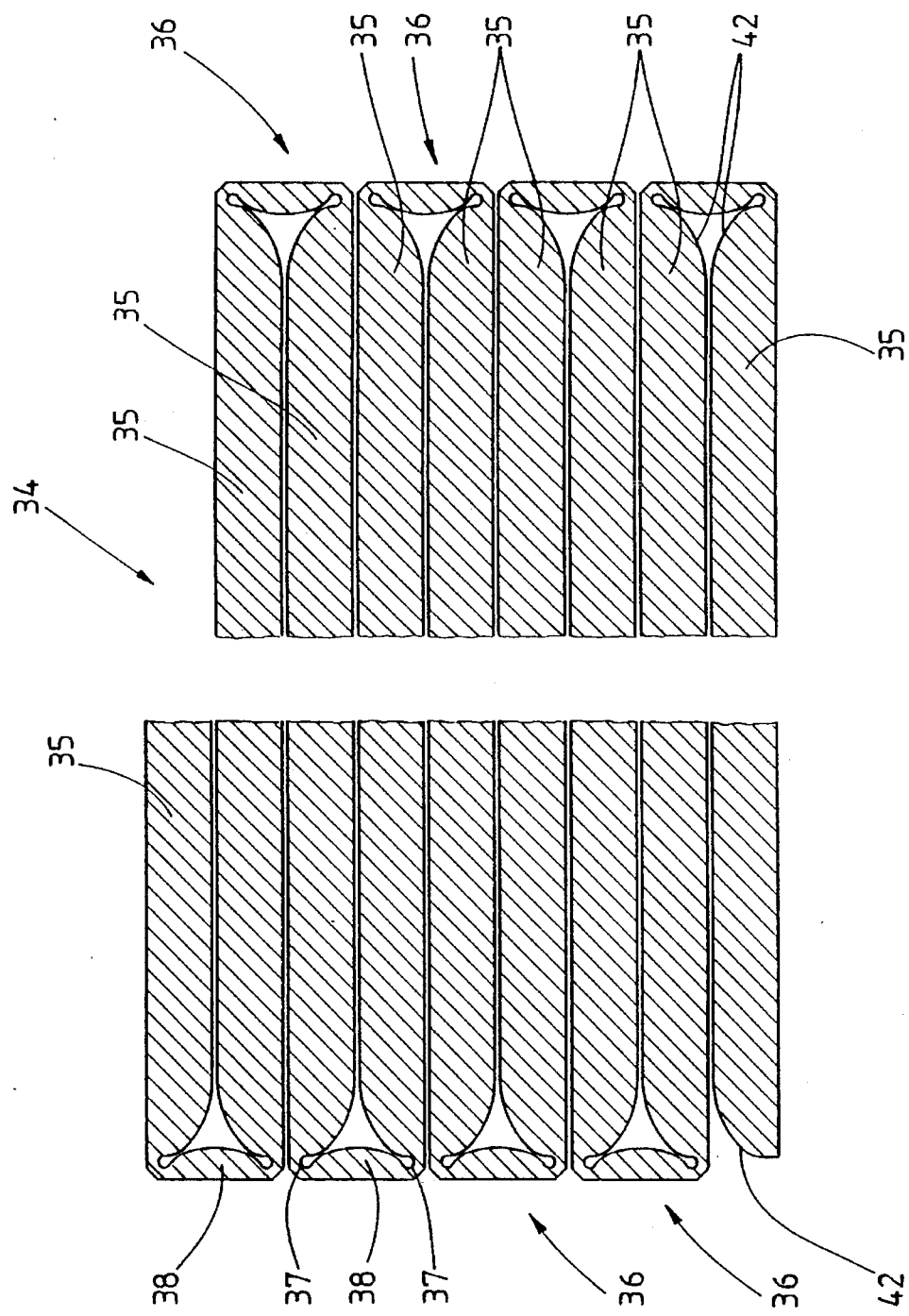
FIG. 4 shows a section of the folded insulating material.

Preferably an insulating material 34 can also be formed from the material web 11, that is to say from a blank made thereof by lateral trimming. T his insulating material 34 consist s of rectangular or square insulating plates 35 which are continuously connected to one another by hinges 36. These hinges 36 ensure that the insulating material can be folded together concertina-like, such that the insulating plates 35 having surfaces of approximately the same size lie on top of one an other as shown in FIG. 4. Thus, the insulating material 34 has a cuboidal shape in which it is easily transported and takes up less space. For processing, the insulating material 34 is folded out, so that the insulating plates 35 come to lie behind one another by means of being pivoted by 180 degrees about their hinges 36, as shown in FIG. 5. Thus, the insulating material 34 forms an insulting layer 39 suitable for covering articles which are to be insulated. In FIG. 5, a wall 40 of a building is indicated which is covered on one side with the insulating layer 39 and is connected thereto by connecting means, for example bolts 41, indicated in the drawing. It is, however, also possible to connect the insulating layer 39 with the wall 40 by means of adhesive bonding. As an alternative to FIG. 5, the insulating material 34 can also be laid in two or several layers by way of just partially unfolding it.

The hinges 36 connecting the insulating plates 35 are designed in a special way. The per se identical hinges 36 between two adjacent insulating plates 35 are formed by two bending lines 37 extending parallel at a distance from one another and a connecting web 38 located thereinbetween. Consequently, the connecting web 38 bridges the distance between two adjacent bending lines 37.

The bending lines 37 continuously extend transversly to the longitudinal direction of the insulating layer 39 across the full width of the insulating plate 35.

The bending lines 37 are on one side embossed into the web of material 11, that is to say into the blank formed therefrom by means of bilateral trimming for forming the insulating material 34. At the same time, the edge portions of each insulating plate 35 which adjoin the bending line 37 are tapered by means of a curved transition 42. Moreover, the connecting webs 38 a recompressed in a direction from the side of the bending lines 37. Thus, the connecting web 38 has a thickness approximately only half as big as the thickness of the insulating plate 35, i.e. of the web of material 11. The connecting webs 38 are designed in a curved or pitched way on the side from which the bending lines 37 have been embossed into the web of material 11 or blank.

The distance between the folding lines 37 of each hinge 36 here approximately corresponds to one and a half times the thickness of each insulating plate 35, that is to say of the web of material 11 which is to form said plate. This purposely chosen distance between the bending lines 37 guarantees in connection with the curved transitions 42 at the edge portions of the insulating plates 35 and the curved design of the connecting webs 38, that the insulating material 34 can be folded together with hardly any force in a concertina-like manner for forming the stack of superposed insulating plates 35 shown in FIG. 4.

In order to produce articles other than blanks 10, the above-described process can be modified in such a way that only extrusion, cooling and division of the web halves 18 and 19 and permanent connection of these between the cylinders 20 and 21 are carried out, specifically both in the "fresh" state of the web halves 18 and 19 and when the expanding agent has already for the most part evaporated. From the web of material 11 obtained thereby, plane boards or other flat articles can then be produced as a result of the transverse severing of individual portions, i.e. not only blanks for packs, namely cartons.

Likewise, only some of the foregoing process steps are necessary if the blank 10 is formed from a web of material obtained in a way other than by extrusion. In such cases, that is to say when the direct production of a foamed web of material is carried out on a suitable plastic-processing machine, to produce the blanks 10 it is sufficient if these are embossed immediately after the cooling of the web of material 11 which is leaving the plastic-processing machine, for example by means of the eccentric press 27 shown in FIGS. 1 and 2 or the like. It is merely necessary to carry out the embossing of the web of material 11 immediately after the latter has been produced, particularly when the expanding agent is still contained virtually completely in the plastic foam.

Finally, the process described can be modified in such a way that, in the "fresh" state of the web of material 11 or of the plastic foam, only the embossing of the folding lines 29 of the blank 10 is carried out. The cutting-out of the blank 10 from the web of material 11 can take place later, specifically even when the expanding agent has already for the most part or completely evaporated.

What is claimed is:

1. A process for producing foldable blanks of plastic foam for forming cartons and insulations, comprising the steps of:

forming a web of material by extruding a foam film tube formed from plastic foam containing an expanding agent; cooling at least an inner side of said foam film tube by means of a cooling mandrel (15) located inside of said foam film tube; and, immediately after cooling of said web of material, with at least the most part of said expanding agent being still contained therein, embossing, by cold forming, folding or bending lines in said web of material.

2. A process for producing foldable blanks of plastic foam for forming cartons and insulations, comprising the steps of:

forming a web of material by extruding a foam film tube formed from plastic foam containing an expanding agent; cutting open said foam film tube; forming a flat web of material from the cut foam material; and, immediately after cooling of said web of material, with at least the most part of said expanding agent being still contained therein, embossing, by cold forming folding or bending lines in said web of material.

3. The process as claimed in claim 1 or 2, wherein the embossing is conducted when the proportion of expanding agent in the plastic foam is still 100 to 60% in comparison with the expanding agent present during formation of the web of material.

4. The process as claimed in claim 1 or 2, wherein the blanks are severed from the web of material after said bending and folding lines have been embossed.

5. The process as claimed in claim 4, wherein each blank is severed from the web of material by means of an embossing cut forming encircling cutting lines.

6. The process as claimed in claim 1 or 2, wherein, simultaneously with the embossing of the bending and folding lines, at least one blank is severed from the web of material.

7. The process as claimed in claim 6, wherein several blanks lying next to one another are severed together from the web of material, with the embossing and/or folding lines being formed simultaneously on all the severed blanks.

8. The process as claimed in claim 6, wherein each blank is severed from the web of material by means of an embossing cut forming encircling cutting lines.

9. The process as claimed in claim 1 or 2, wherein polystyrene is used as a plastic foam.

10. The process as claimed in claim 2, wherein said cooling is achieved by cooling at least an inner side of said foam film tube by means of a cooling mandrel (15) located inside of said foam film tube.

11. A process for producing foldable blanks of plastic foam, comprising the steps of:

forming a web of material from heated plastic foam containing an expanding agent;

then, cooling the web; and then, immediately after cooling, and before more than 40% of the expanding agent, which was in the plastic foam during said forming step, has evaporated from the foam, embossing, by cold forming, folding lines in the cooled web.

12. The process as claimed in claim 11, wherein said forming step comprises extruding the web from the heated plastic foam.

13. The process as claimed in claim 12, wherein the embossing step is performed while substantially 100% of the expanding agent that was in the plastic foam during the forming step remains in the cooled web.

* * * * *